United States Patent [19]

Nagase et al.

[11] 4,125,796
[45] Nov. 14, 1978

[54] CONTROL APPARATUS FOR USE IN A SYNCHRONOUS MACHINE

[75] Inventors: Hiroshi Nagase; Toshiaki Okuyama; Yuzuru Kubota, all of Hitachi; Katsunori Suzuki, Takahagi, all of Japan

[73] Assignee: Hitachi, Ltd., Japan

[21] Appl. No.: 820,649

[22] Filed: Aug. 1, 1977

[30] Foreign Application Priority Data

Jul. 30, 1976 [JP] Japan .................................. 51/90283

[51] Int. Cl.² .......................................... H02K 29/00
[52] U.S. Cl. .................................... 318/175; 318/254
[58] Field of Search ............... 318/175, 176, 179, 165, 318/254, 138, 227

[56] References Cited

U.S. PATENT DOCUMENTS 4,060,753  11/1977  Okuyama et al. ..................... 318/175

Primary Examiner—Herman J. Hohauser
Attorney, Agent, or Firm—Craig & Antonelli

[57] ABSTRACT

A control apparatus for use in a synchronous machine having a field and an armature windings, one of the windings being provided on a stator and the other winding on a rotor comprises a thyristor converter for feeding the armature winding with electric power. A rotor position detector, an actual current detector and a rotating speed detector are provided. A current pattern signal is produced on the basis of the rotor position signal and the rotating speed signal and is compared with the actual armature current. A gate pulse generator controls the thyristors of the thyristor converter in accordance with the difference between the current pattern signal and the actual armature current signal. A phase shifter is provided for shifting the current pattern signal. A phase detector detects the phase difference between the armature current supplied for the armature winding and the rotor position, and the phase shifting operation of the phase shifter is controlled in accordance with an output from the phase detector.

5 Claims, 10 Drawing Figures

CONTROL APPARATUS FOR USE IN A SYNCHRONOUS MACHINE

BACKGROUND OF THE INVENTION

This invention relates to a control apparatus for a commutatorless synchronous machine, particularly to the control circuit which controls current fed to an armature winding of the commutatorless synchronous machine.

In a conventional synchronous machine, when it operates at the relatively high speed, the actual current flowing through the armature winding is retarted in phase with respect to a nominal armature current because of, for example, the delay in the response of the control circuit. The phase-delay of the armature current results in the lowering of the power factor of the synchronous machine.

In a Japanese patent laying-open No. 50-77814 which was opened to public on June 25, 1975, the control circuit is disclosed in which the delay of the armature current is compensated by advancing the nominal pattern signal in accordance with the operating speed of the synchronous machine. Since, however, the delay of the armature current is caused not only by the delay of response of the control circuit, but also by the field current, the amount of the advanced phase in the nominal pattern signal can not be determined by only the operating speed of the synchronous machine. The synchronous machine having the control circuit as above-described, therefore, has a drawback that it is not able to operate at the preset power factor accurately.

SUMMARY OF THE INVENTION

An object of this invention is to provide a circuit used in a synchronous machine for controlling the armature current accurately.

The object mentioned above is achieved by a control apparatus for a synchronous machine with a field and an armature windings, one of the windings being provided on a stator of the machine and the other winding on a rotor thereof, comprising a converter having a plurality of thyristors for controlling an electric power fed to the armature winding, means for producing a signal corresponding to the position of the rotor, means for generating an armature current pattern signal on the basis of both the output signal of the producing means and the difference between a speed reference and an actual rotating speed of the rotor, and means for controlling the thyristors in accordance with the deviation between an actual armature current and the armature current pattern signal, characterized by means for detecting a phase difference between the actual armature current and the output signal of the producing means and means for shifting the output signal of the producing means in accordance with the output of said detecting means.

DETAILED DESCRIPTION OF PREFERRED EMBODIMENTS

Figure 1:
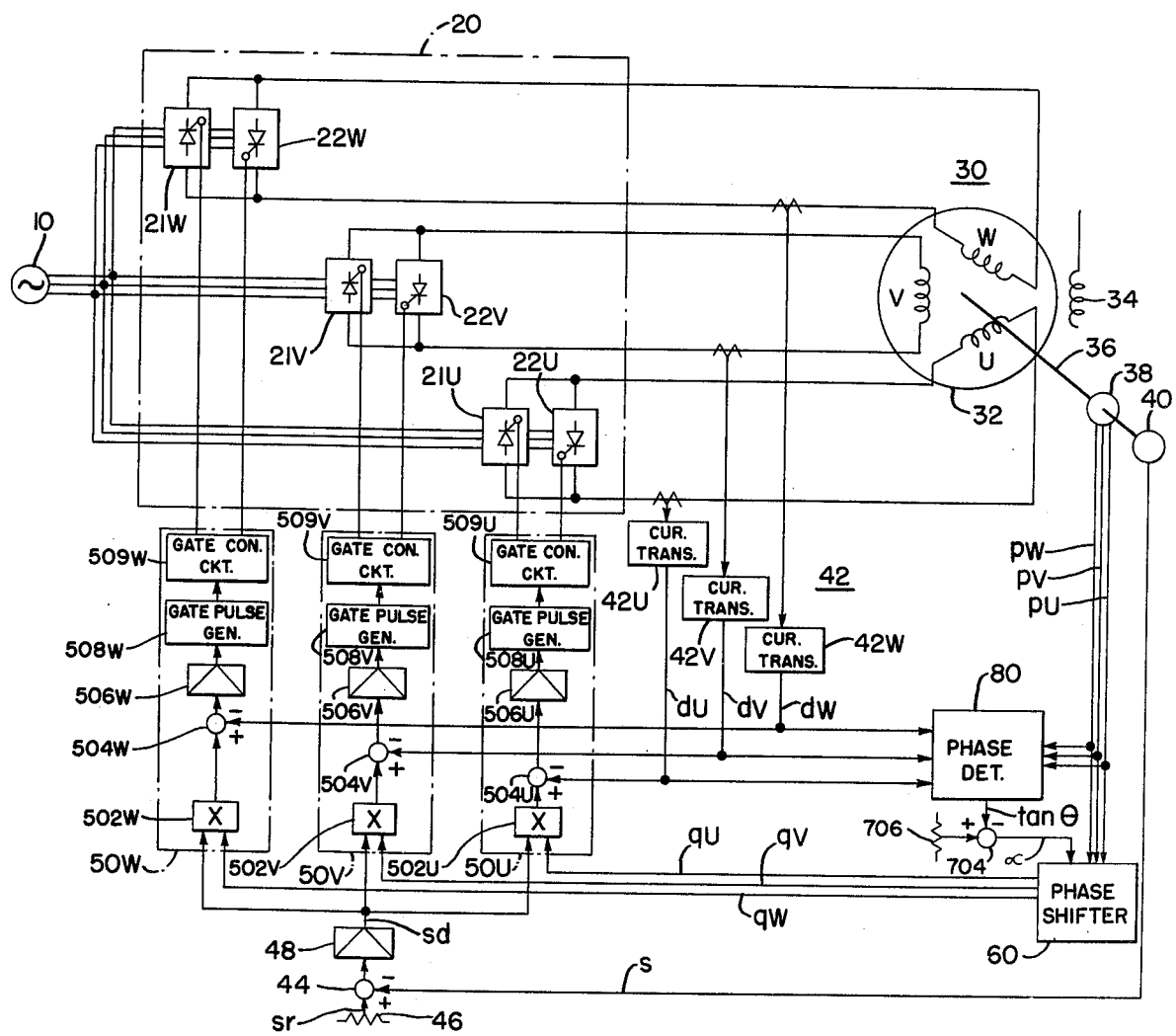
FIG. 1 is a schematic diagram of a circuit for use in a synchronous machine constructed in accordance with this invention.

Referring to FIG. 1, a three-phase power source 10 feeds through a cyclo-converter 20 three armature windings U, V and W which are provided on a rotor 32 of a commutatorless synchronous machine 30. A field winding 34 is arranged around the rotor 32 for generating main field poles and fed with exiting current from another power source (not shown). The rotor 32 is mounted on a shaft 36. The cyclo-converter 20 consists of three pairs of known three-phase thyristor bridge circuits 21U and 22U, 21V and 22V and 21W and 22W each pair of which comprises two of the three-phase thyristor bridge circuits and is assigned to the corresponding armature windings U, V and W. Thyristors of the bridge circuits are triggered by means of a control section which will be mentioned hereinafter.

A rotor position detector 38 comprises a permanent magnet rotor mounted on the shaft 36 and three Hall elements which are disposed around the magnetic rotor with a certain airgap and spaced by 120° with respect to one another. The Hall elements generate a sinusoidal voltage output of the three phases $pU$, $pV$ and $pW$, which correspond to the three phases of the rotor 32, so that the rotor position detector 38 can detects the angular position of the rotor 32. The frequency of the output of the detector 38 changes in proportion to the rotating speed of the rotor 32, but the amplitude thereof is always maintained at the constant value which is proportional to the intensity of the magnetic field produced by the rotating permanent magnet rotor. A tachometer generator 40 is also mounted on the shaft 36 to provide its output terminal with a signal s proportional to the actual rotating speed of the rotor 32. An actual current detector 42 has three current transformers 42U, 42V and 42W and generates an actual current signal consisting of three voltage signals $dU$, $dV$ and $dW$. Each of the current transformers 42U, 42V and 42W has a winding which is wound on a conductor line, through which the corresponding armature winding U, V and W are fed with three-phase current from the cyclo-converter 20, each current transformer generating the signal proportional to the instantaneous value of the armature current flowing through the conductor line.

The output of the tachometer generator 40 is connected to a minus input terminal of a comparator 44, and a plus input terminal thereof is connected to a speed reference signal generator 46. The speed reference signal generator 46, for example, consists of a potentiometer whose variable contact arm is connected to the plus input terminal of the comparator 44 and generates a reference signal sr corresponding to the desired rotating speed of the rotor 32 of the synchronous machine 30. The value of the speed reference signal sr is preset by an operator at will. The comparator 44 provides each of thyristor control circuits 50U, 50V and 50W through the amplifier 48 with a differential signal sd between the signal sr from the speed reference signal generator 46 and the actual speed signal s from the tachometer generator 40.

The output signals $pU$, $pV$ and $pW$ from the rotor position detector 38 are led to a phase shifter 60 and a phase detector 80. Further, the signals $dU$, $dV$ and $dW$ from the actual current detector 42 are given to the phase detector 80. The phase detector 80 produces an output signal tan $\theta$ which indicates the phase difference between the actual armature current and the actual armature voltage, the phase of which corresponds to the rotor position signal $pU$, $pV$ and $pW$. The signal tan $\theta$ is led to a minus input terminal of a comparator 704, a plus input terminal of which is connected to a potentiometer 706 which serves as means for presetting a reference for a desired phase difference between the armature current and the armature voltage. By the comparator 704, the signal tan $\theta$ is compared with the reference, so that the deviation therebetween is output as a signal $\alpha$ to the phase shifter 60, to which, as above mentioned, the signals $pU$, $pV$ and $pW$ are also applied. The phase shifter 60 shifts the rotor position signals $pU$, $pV$ and $pW$ in accordance with the deviation signal $\alpha$ to produce signals $qU$, $qV$ and $qW$, which are also led to the thyristor control circuits 50U, 50V and 50W. The details of the arrangement and operation of the phase detector 80, the comparator 704 and the phase shifter 60 will be given by reference of FIGS. 2 and 3 after.

Each of the thyristor control circuits 50U, 50V and 50W is assigned to the corresponding pairs of three-phase bridge circuits 21U and 22U, 21V and 22V and 21W and 22W, every control circuit having the same elements and the same construction as one another. The explanation, therefore, will be made of only one of those, e.g. of the thyristor control circuit 50U hereinafter. The thyristor control circuit 50U has a multiplier 502U which is provided with the differential signal sd from the comparator 44 to one of its two input terminals through the amplifier 46 and with the signal $qU$ from the phase shifter 60 to the other input terminal. The multiplier 502 generates an output signal which represents the U-phase current to be fed to the armature winding U of the synchronous machine 30. i.e. the shifted rotor position signal for the U-phase. The output signal from the multiplier 502U is led to a plus input terminal of a comparator 504U, a minus input terminal of which is provided with the signal dU from the current transformer 42U of the actual current detector 42. A different output signal of the comparator 504U is led to a gate pulse generator 508U through an amplifier 506U. The gate pulse generator 508U generates gate pulse signals, which are applied through a gate control circuit 509U to the thyristors forming the pair of three-phase bridge circuits 21U and 22U. The same is true of the thyristor control circuits 50V and 50W except that the signals $qV$ and $qW$ are given to the multipliers 502V and 502W and the signals $dV$ and $dW$ to the comparators 504V and 504W, respectively. It is also of course that the output signals of the thyristor control circuits 50V and 50W are applied to the pairs of the three-phase bridge circuits 21V, 22V and 21W, 22W respectively.

The three-phase current of the synchronous machine 30 is controlled as follows. The comparator 44 produces the differential signal sd proportional to the difference between the desired speed reference signal sr from the speed reference signal generator 46 and the actual speed signal s from the tachometer generator 40. The differential signal sd of the comparator 44 determines the amplitude of the three-phase current to be fed for the armature windings U, V and W of the synchronous machine 30. The mutlipliers 502U, 502V and 502W multiply the differential signal sd from the comparator 44 by the sinusoidal signals $qU$, $qV$ and $qW$ from the phase shifter 60 respectively. Each of the output signals of the multiplier 502U, 502V and 502W is compared with that corresponding signal $dU$, $dV$ or $dW$ of the actual current signal from the actual current detector 42, which indicates the actual current supplied for the armature winding U, V or W of the synchronous machine 30. The gate pulse generators 508U, 508V and 508W generate the respective pulse signals depending on the differential signals from the comparator 504U, 504V and 504W respectively. The gate pulse generators 508U, 508V and 508W generate the pulse signals to control the firing angles of the thyristors contained in the three-phase bridge circuits 21U and 22U, 21V and 22V and 21W and 22W. For example, the firing angles of the thyristors of one pair of three-phase bridge circuits 21U and 22U are determined in accordance with the amplified differential signal from the amplifier 506U which is rectified in the gate pulse generator 508U. The rectified differential signal represents the difference in the phase and amplitude between the actual current signal and the current pattern signal.

The phase detector 80 detects the phase difference between the actual armature current which is represented by the signal from the actual current detector 42 and the armature voltage which corresponds to the rotor position signal from the rotor position detector 38. The phase shifter 60 produces the sinusoidal signals $qU$, $qV$ and $qW$ phase-shifted with respect to the signals $pU$, $pV$ and $pW$ from the rotor position detector 40. The amount of the phase shifting is controlled in accordance with the phase shifting control signal $\alpha$ from the comparator 704. The phase difference between the actual three-phase current and voltage fed to the synchronous machine 30 can be controlled accurately so as to follow the preset reference therefor.

Figure 2:
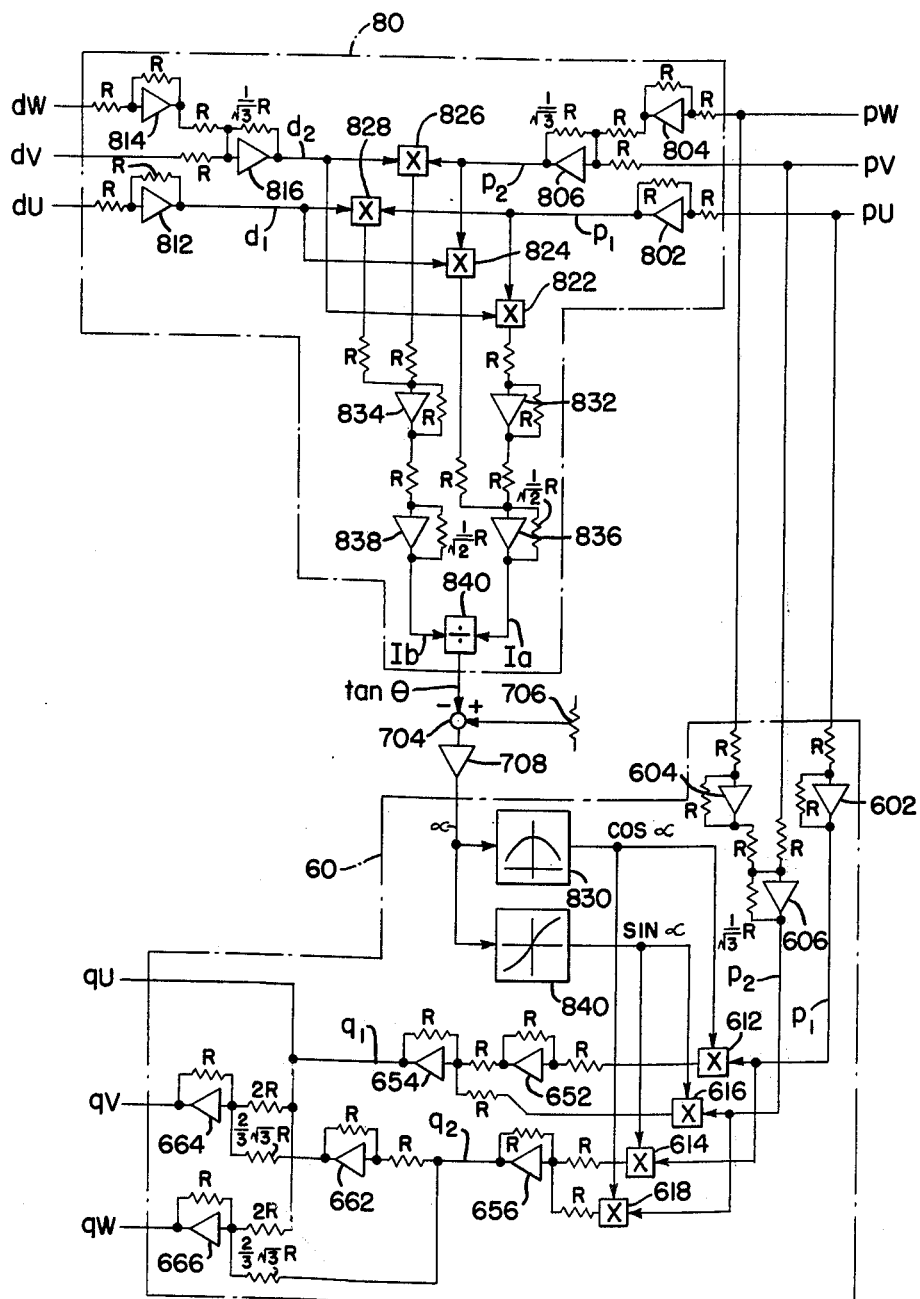
FIG. 2 is a diagram which shows of a phase shifter, a phase controller and a phase detector shown in FIG. 1 in detail.

More detailed description of the phase shifter 60, the comparator 704, the potentiometer 706 and the phase detector 80 will be given by reference to FIG. 2 hereinafter. The phase detector 80 has three operational amplifiers (OP amplifiers) 802, 804 and 806. Input and feed back resistors of the OP amplifiers 802 and 804 and two input resistors of the OP amplifier 806 have same resistance value R, and a feed back resistor connected to the OP amplifier 806 has value $1/\sqrt{3}$ R. The OP amplifiers 802 and 804 operate as a sign changer and the amplifier 806 as an adder. The signal $pU$ from the rotor position detector 38 is changed to a signal $p1$ through the amplifier 802. The signals $pV$ and $pW$ are added in the amplifier 806 to become a signal $p2$, after the sign of the signal $pW$ is changed by the amplifier 804. Assuming that the three signals $pU$, $pV$ and $pW$ are represented respectively as follows, $$pU = A \sin \omega t \qquad (1)$$

$$pV = A \sin (\omega t - 120°) \qquad (2)$$

$$pW = A \sin (\omega t - 240°) \qquad (3)$$

where A is an amplitude of the three-phase signal, $\omega$ an angular velocity thereof and $t$ time. The converted two-phase signals $p1$ and $p2$ are represented by following two equations.

$$p1 = -pU = A \sin(\omega t - 180°) \quad (4)$$

$$p2 = 1/\sqrt{3}\,(pV - pW) = A \sin(\omega t - 90°) \quad (5)$$

The phase detector 80 has further three OP amplifiers 812, 814 and 816 which also convert the three-phase signal into the two-phase signal. The OP amplifiers 812 and 814 operate as the sign changers and the amplifier 816 as an adder, the constructions of which is the same as that of the amplifiers 802, 804 and 806 mentioned above. Accordingly, the OP amplifiers 813, 814 and 816 convert the three signals $dU$, $dV$ and $dW$ from the actual current detector 42 into the signals $d1$ and $d2$ in the same way. Now, assuming that the voltage signals $dU$, $dV$ and $dW$ are represented respectively as follows, $$dU = \sqrt{2}\,I_m \sin(\omega t - \theta) \quad (6)$$

$$dV = \sqrt{2}\,I_m \sin(\omega t - 120° - \theta) \quad (7)$$

$$dW = \sqrt{2}\,I_m \sin(\omega t - 240° - \theta) \quad (8)$$

where $I_m$ is an effective amplitude of the three-phase signal, and $\theta$ the phase difference between the three phase signals $pU$, $pV$ and $pW$ and the three phase signals $dU$, $dV$ and $dW$. The two signals $d1$ and $d2$ are represented by following two equations.

$$d1 = -dU = \sqrt{2}\,I_m \sin(\omega t - 180° - \theta) \quad (9)$$

$$d2 = 1/\sqrt{3}\,(dV - dW) = \sqrt{2}\,I_m \sin(\omega t - 90° - \theta) \quad (10)$$

The phase detector 80 has four multipliers 822, 824, 826 and 828 and four OP amplifiers 832, 834, 836 and 838. The OP amplifier 832 operates as the sign changer, the OP amplifier 838 as a scale changer and the OP amplifiers 834 and 836 operate as the adder. Resistors connected to the sign changer 832 and the adder 834 and the input resistors of the adder 836 and the scale changer 838 have all the same resistance value R. The feedback resistors of the adder 836 and the scale changer 838 have both the same value $1/\sqrt{2}\,R$. The signal $p1$ is multiplied by the signal $d2$ in the multiplier 822 and thereafter led to the sign changer 832. The output signal of the sign changer 832 and the signal $p2$ multiplied by the signal $d1$ in the multiplier 824 are led to the adder 836 which generates a signal $Ia$. The signal $p1$ multiplied by the signal $d1$ in the multiplier 828 and the signal $p2$ multiplied by the signal $d2$ in the multiplier 826 are led to the adder 834 which generates a signal $Ib$ through the scale changer 838. These signals $Ia$ and $Ib$, as is apparent from the above description, are represented by following two equations.

$$Ia = A \cdot I_m \cos\theta = 1/\sqrt{2}\,(p1d2 - p2d1) \quad (11)$$

$$Ib = A \cdot I_m \sin\theta = 1/\sqrt{2}\,(p1d1 + p2d2) \quad (12)$$

The phase detector 80 further has a divider 840 which divides the signal Ib by the signal Ia as indicated by following equation.

$$\frac{Ib}{Ia} = \frac{A \cdot I_m \sin\theta}{A \cdot I_m \cos\theta} = \tan\theta \quad (13)$$

The divided signal $Ib/Ia$ is led to a minus input terminal of the comparator 704, a plus input terminal of which is provided with the phase shifting reference signal from the generator 706. The differential signal from the comparator 704 appears through an amplifier 708 as the phase shifting control signal $\alpha$ which, as mentioned above, controls the phase shifting operation of the phase shifter 60. The phase shifting reference signal generator 706 is constructed with a potentiometer and the phase shifting reference signal is preset by the operator at a given value corresponding to the operating condition of the synchronous machine 30. For example, when the machine 30 is desired to operate on the condition that the phase difference between the rotor position signal ($pU$, $pV$ and $pW$) and the actual current signal ($dU$, $dV$ and $dW$) is zero, the value of the phase shifting reference signal is preset at zero. The phase shifting in accordance with the ratio $Ib/Ia$ is achieved by the phase shifter 60, the operation of which will be given hereafter. Moreover, when the synchronous machine 30 is desired to operate at a given phase difference $\theta 1$, the value of phase shifting reference signal is preset at the value $\tan\theta 1$.

The phase shifter 60 includes three OP amplifiers 602, 604 and 606 which is constructed in the same manner as the OP amplifiers 802, 804 and 806 of the phase detector 80, and four multipliers 612, 614, 616 and 618. The OP amplifiers 602 and 604 operate as the sign changer and the OP amplifier 606 as the adder. These amplifiers 602, 604 and 606 also convert the three signals $pU$, $pV$ and $pW$ into the two signals $p1$ and $p2$. The signal $p1$ is led to both the multipliers 612 and 614 and the signal $p2$ to both the multipliers 616 and 618. While, a cosine wave generator 830 and a sine wave generator 840, both of which are provided with the phase shifting control signal $\alpha$ from the phase controller 70, generate signals $\cos\alpha$ and $\sin\alpha$ respectively. The signal $\cos\alpha$ is led to both the multipliers 612 and 618 and the signal $\sin\alpha$ to both the multipliers 614 and 616. The phase shifter 60 has further three OP amplifiers 652, 654 and 656, all resistors connected to which have the same resistance value R. The OP amplifier 652 operates as the sign changer and the OP amplifiers 654 and 656 as the adder. A output signal from the multiplier 612 is led to the adder 654 through the sign changer 652, and an output signal from the multiplier 616 is also fed to directly the adder 654 which generates a signal $q1$. An output signals from the multiplier 614 and 618 are led to the adder 656 which generates a signal $q2$. The signals $q1$ and $q2$, therefore, are indicated by following equations.

$$q1 = p1 \cos\alpha - p2 \sin\alpha = \sin(\omega t + \alpha) \quad (14)$$

$$q2 = -p1 \sin\alpha - p2 \cos\alpha = \sin(\omega t + \alpha - 90°) \quad (15)$$

The two signals $q1$ and $q2$ are converted into the three signals $qU$, $qV$ and $qW$ by the cooperation of three OP amplifiers 662, 664 and 666 which are further provided in the phase shifter 60. The OP amplifier 662 which has an input resistor and a feedback resistor of same value R operates as the sign changer. Each of the OP amplifiers 664 and 666 has the feedback resistor of value R and two input resistors one of which has the resistance value 2R and the other the value $\frac{2}{3}\sqrt{3}\,R$. The signal $q1$ appears as the signal $qU$ while it is further led to the adders 664 and 666 through the respective input resistors of the value 2R. The signal $q2$ is led to the adder 664 through the sign changer 662 and the input resistor of the value $\frac{2}{3}\sqrt{3}\,R$ while it is further led to the adder 666 through the input resistor of the value $\frac{2}{3}\sqrt{3}\,R$. The adder 664 generates the signal $qV$ and the adder 666 the signal $qW$.

Therefore, these three signals $q$U, $q$V and $q$W are represented by following three equations.

$$qU = q1 = \sin(\omega t + \alpha) \qquad (16)$$

$$qV = -\tfrac{1}{2} q1 + 3/2\, q2 = \sin(\omega t + \alpha - 120°) \qquad (17)$$

$$qW = -\tfrac{1}{2} q1 - 3/2\, q2 = \sin(\omega t + \alpha - 240°) \qquad (18)$$

Apparently from these equation, the three voltage signals $p$U, $p$V and $p$W from the rotor position detector 38 are shifted by the angular in phase corresponding to the signal $\alpha$ by the function of the phase shifter 60 mentioned above.

Figure 3:
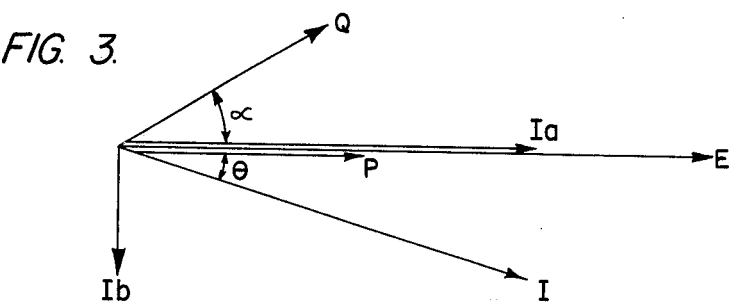
FIG. 3 shows various vectors for purpose of explaining the operation of the circuit shown in FIG. 1.

In FIG. 3, there are various vectors for the purpose of explanation of the function of the circuit mentioned above, wherein the three-phase signal is representively shown by a single vector. A vector E and a vector I indicate the voltage and the current fed to the armature windings U, V and W of the synchronous machine 30. A vector P and a vector Q indicate the three-phase signal ($p$U, $p$V and $p$W) from the rotor position detector 38 and the three-phase signal ($d$U, $d$V and $d$W) from the actual current detector 42. The vector P is in the same phase as the vector E. The phase detector 80 produces the two signals I$a$ and I$b$ upon receipt of the three-phase rotor position signal ($p$U, $p$V and $p$W) and the three-phase actual current signal ($d$U, $d$V and $d$W). The two signals I$a$ and I$b$ are represented by vectors I$a$ and I$b$ respectively, I$a$ being coincident with the vector P in phase and I$b$ orthogonal thereto. The phase detector 80 detects the phase difference $\theta$ between the vectors I$a$ and I and controls the phase shifting of the phase shifter 60.

Figure 4:
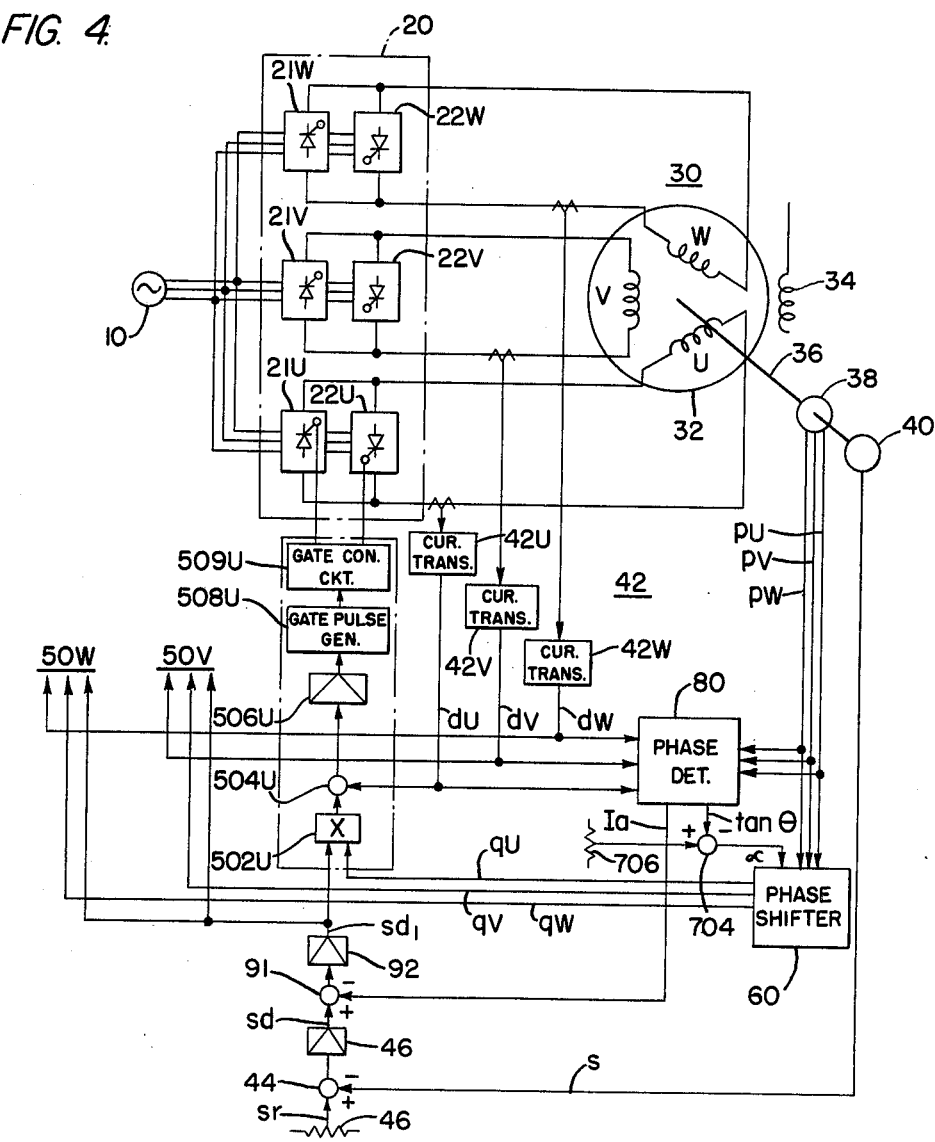
FIG. 4 shows one variation of the embodiment shown in FIG. 1.

Referring now to FIG. 4, one of variations of the embodiment of FIG. 1 is shown, wherein like reference numerals indicate like elements. This variation has further a comparator 91 and an amplifier 92 which are inserted in series between the amplifier 46 and the three thyristor control circuits 50U, 50V and 50W, only one of which is fully disclosed therein representively. The comparator 91 receives the differential signal $sd$ through the amplifier 46 at the plus input terminal, a minus input terminal of which is provided with the signal I$a$ from the phase detector 80. The comparator 91 generates a differential signal $sd$1 proportional to the difference between the signal $sd$ and the signal I$a$ to the thyristor control circuits 50U, 50V and 50W. As is apparent from FIG. 3, the signal I$a$ indicates one component of the current fed to the synchronous machine 30, which is coincident with the rotor position vector P. The signal I$a$ coincident with the rotor position vector P in phase, as is apparent from FIG. 3, indicates an effective component of the armature current which generates a torque. The output signal from the comparator 91 becomes to have relation to the effective component of the armature current fed to the synchronous machine 30. Therefore, the armature current can be controlled more suitably in the transient at which the load of the synchronous machine 30 is suddenly changed.

Figure 5:
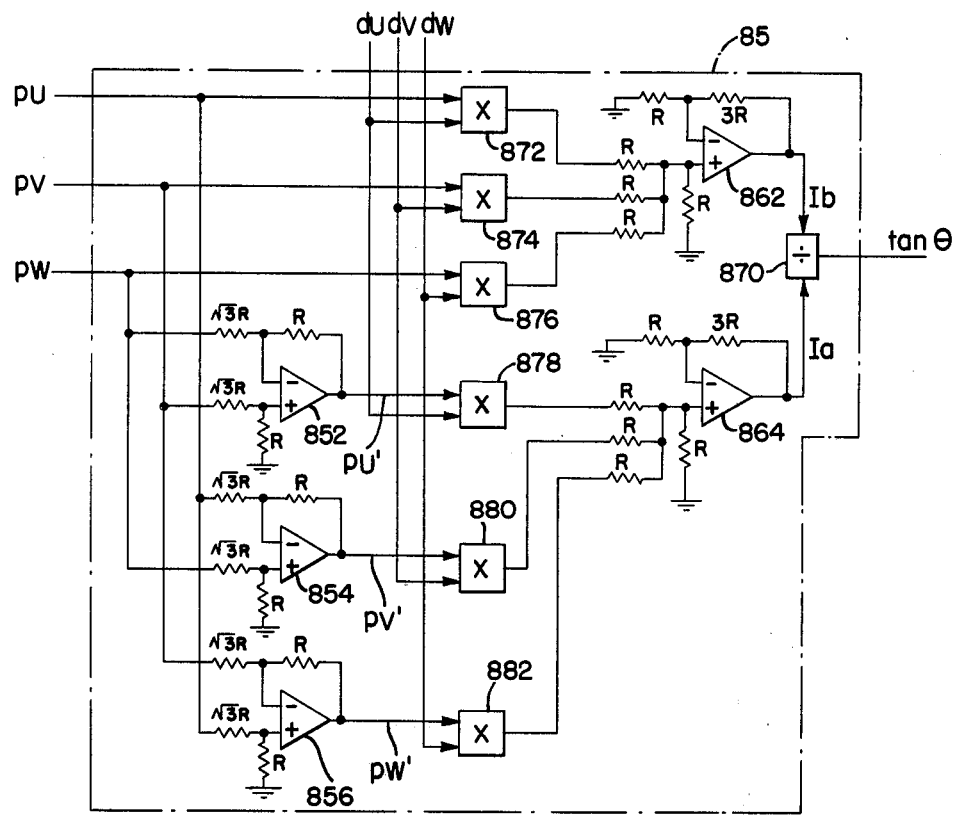
FIG. 5 shows another embodiment of the phase detector shown in FIG. 2.

In FIG. 5, there is illustrated another phase detector 85 which can be substituted for the phase detector 80 shown in FIGS. 1 and 4. In this figure, the three signals $p$U, $p$V and $p$W from the rotor position detector 38 and the three signals $d$U, $d$V and $d$W from the actual current detector 42 are applied to the another phase detector 85. The phase detector 85 has five OP amplifiers 852, 854, 856, 862 and 864 each having a plus input terminals and a minus one, six multipliers 872, 874, 876, 878, 880 and 882 and a divider 870. Each of the OP amplifiers 852, 854 and 856 has a feed back resistor of the same value R which is connected across the input and output terminal thereof, and the minus input terminal is provided with the corresponding signal $p$U, $p$V or $p$W through an input resistor of the resistance value $\sqrt{3}$ R. Each plus input terminal of the OP amplifiers 852, 854 and 856 is provided with the corresponding signals $p$U, $p$V and $p$W through input resistor of the resistance value $\sqrt{3}$ R and is also grounded through a resistor of the value R. The signal $p$U is led to both the minus input terminal of the OP amplifier 854 and the plus input terminal of the OP amplifier 856, the signal $p$V to both the minus input terminal of the OP amplifier 856 and the plus input terminal of the OP amplifier 852, and the signal $p$W to both the minus terminal of the OP amplifier 852 and the plus input terminal of the OP amplifier 854. Output signals $p'$U, $p'$V and $p'$W of the OP amplifiers 852, 854 and 856 are represented by following equations.

$$p'U = (1/\sqrt{3})(pV - pW) = A \sin(\omega t - 90°) \qquad (19)$$

$$p'V = (1/\sqrt{3})(pW - pU) = A \sin(\omega t - 210°) \qquad (20)$$

$$p'W = (1/\sqrt{3})(pU - pV) = A \sin(\omega t - 330°) \qquad (21)$$

The output signals $p'$U, $p'$V and $p'$W are led to the multipliers 878, 880 and 882, which are further provided with the corresponding signals $d$U, $d$V and $d$W. Further, the signals $p$U, $p$V and $p$W are led to the multipliers 872, 874 and 876 respectively, which are provided with the corresponding signals $d$U, $d$V and $d$W. The output signals from the three multipliers 872, 874 and 876 are led to the plus input terminal of the OP amplifier 862 through three input resistors of the same value R. The output signals from the multipliers 878, 880 and 882 are led to the plus input terminal of the OP amplifier 864 through three input resistors of the same value R. Each of the OP amplifiers 862 and 864 has a feedback resistor of the resistance value 3R connected across the minus input terminal and the output terminal thereof. The plus input terminal and the minus input terminal of the OP amplifiers 862 and 864 are grounded through resistors of the same value R respectively. The output signals I$a$ and I$b$ of the OP amplifiers 862 and 864 are represented by following equations, $$Ia = K(p'U \cdot dU + p'V \cdot dV + p'W \cdot dW) \qquad (22)$$
$$= A\, Im \cos \theta$$

$$Ib = K(pU \cdot dU + pV \cdot dV + pW \cdot dW) \qquad (23)$$
$$= A\, Im \sin \theta$$

where K is constant. The divider 870 divides the signal I$b$ by the signal I$a$ as indicated by following equation.

$$\frac{Ib}{Ia} = \frac{A\, Im \sin \theta}{A\, Im \cos \theta} = \tan \theta \qquad (24)$$

Apparently, this phase shifter 85 mentioned above has the same function as that shown in FIG. 1.

Figure 6:
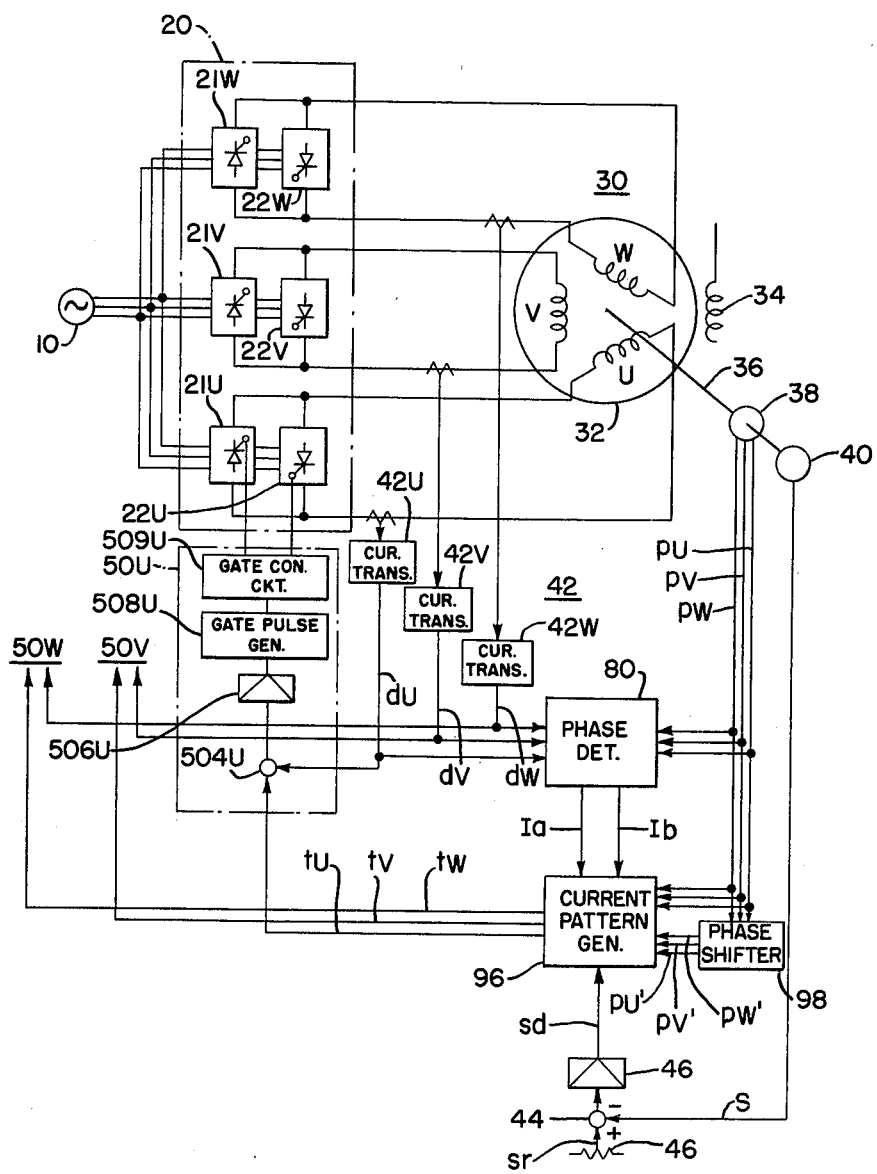
FIG. 6 is a schematic diagram of another embodiment constructed in accordance with this invention.

Referring to FIG. 6, another embodiment constructed in accordance with this invention is shown where like reference numerals indicate like elements above. In this embodiment, a current pattern generator 96 and another kind of phase shifter 98 are provided. The current pattern generator 96 produces a three-phase current pattern signal consisting of signals tU, tV and tW, each of which determines the phase and amplitude of the current which is applied to the corresponding winding U, V and W of the synchronous machine 30. The current pattern generator 96 is provided with the signals Ia and Ib from the phase detector 80 and the signals pU, pV and pW from the rotor position detector 38. The current pattern generator 96 is further provided with signals p'U, p'V and p'W from the phase shifter 98 and the differential signal sd which is applied through the amplifier 46 from the comparator 44. The phase shifter 98 shifts the signals pU, pV and pW by 90° in phase thereof to produce the signal p'U, p'V and p'W. The signals tU, tV and tW is led to the corresponding comparators of the thyristor control circuits 50U, 50V and 50W (only the comparator 504U is shown representively). In the thyristor control circuits 50U, 50V and 50W, as is apparent from the figure, the multipliers which are indicated by the reference numerals 502U, 502V and 502W in the above description are removed.

Figure 7:
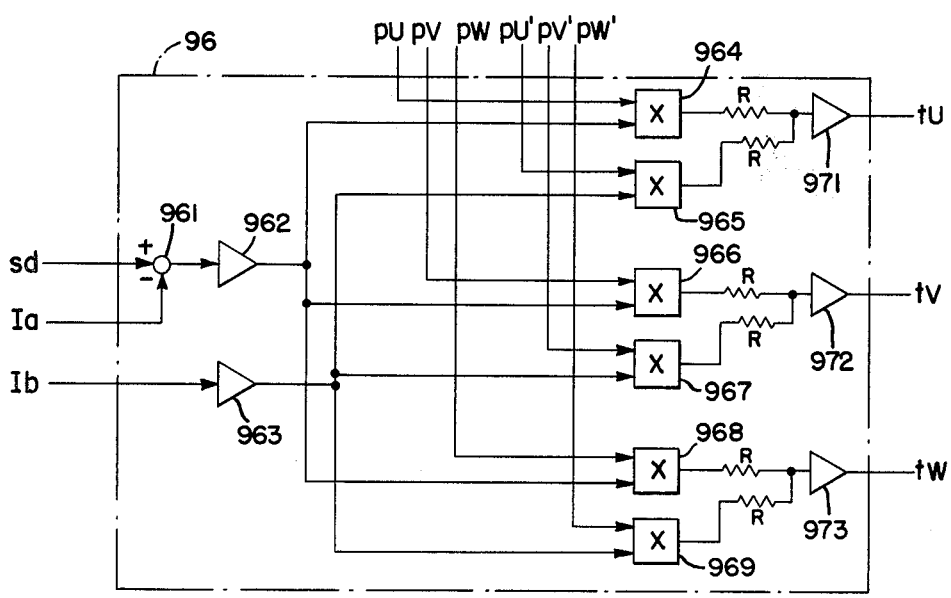
FIG. 7 shows the detail of a current pattern generator shown in FIG. 6.

In FIG. 7, the detail of the current pattern generator 96 is disclosed. The current pattern generator 96 is constructed with a comparator 961, two amplifiers 962 and 963, six multipliers 964 and 969 and three adders 971 to 973. The differential signal sd which is obtained through the amplifier 46 from the comparator 44 is led to a plus input terminal of the comparator 961, a minus input terminal of which is provided with the signal Ia from the phase detector 80. An output signal from the comparator 961 is led through the amplifier 962 to the multipliers 964, 966 and 968. The signal Ib from the phase detector 80 is led through the amplifier 963 to the multipliers 965, 967 and 969. The signals pU, pV and pW from the rotor position detector 38 and the signals p'U, p'V and p'W from the phase shifter 98 are also led to the multipliers 964 to 969 respectively, i.e. the signal pU is led to the multiplier 964, the signal pV to the multiplier 966, the signal pW to the multiplier 968, the signal p'U to the multiplier 965, the signal p'V to the multiplier 967, and the signal p'W to the multiplier 969. Output signals from the multipliers 964 and 965 are ld through respective input resistors to the adder 971, output signals from the multipliers 966 and 967 through respective input resistors to the adder 972, and output signals from the multipliers 968 and 969 through respective input resistors to the adder 973. All the input resistors of the adders 971, 972 and 973 have same resistance value R. The output signals tU, tV and tW are represented by following equations, $$tU = pU(sd - Ib) + p'U \cdot Ia = P \sin(\omega t + Q) \quad (25)$$

$$tV = pV(sd - Ib) + p'V \cdot Ia = P \sin(\omega t - 120° + Q) \quad (26)$$

$$tW = pW(sd - Ib) + p'W \cdot Ia = P \sin(\omega t - 240° + Q) \quad (27)$$

where P is equal to $\sqrt{(sd - Ib)^2 + Ia^2}$, and Q to $\tan^{-1}(Ia/(sd - Ib))$.

The phase shifter 98 can be constructed with three OP amplifiers which are constructed in like manner to the three OP amplifiers 852, 854 and 856 of the phase detector 85 shown in FIG. 5. As mentioned above, these OP amplifiers 852, 854 and 856 shift the signals pU, pV and pW by 90° in phase thereof.

According to this embodiment, the amplitude and the phase of the current applid to the armature U, V and W of the synchronous machine 30 are controlled in accordance with the phase difference between the actual armature current and the rotor position.

Figure 8:
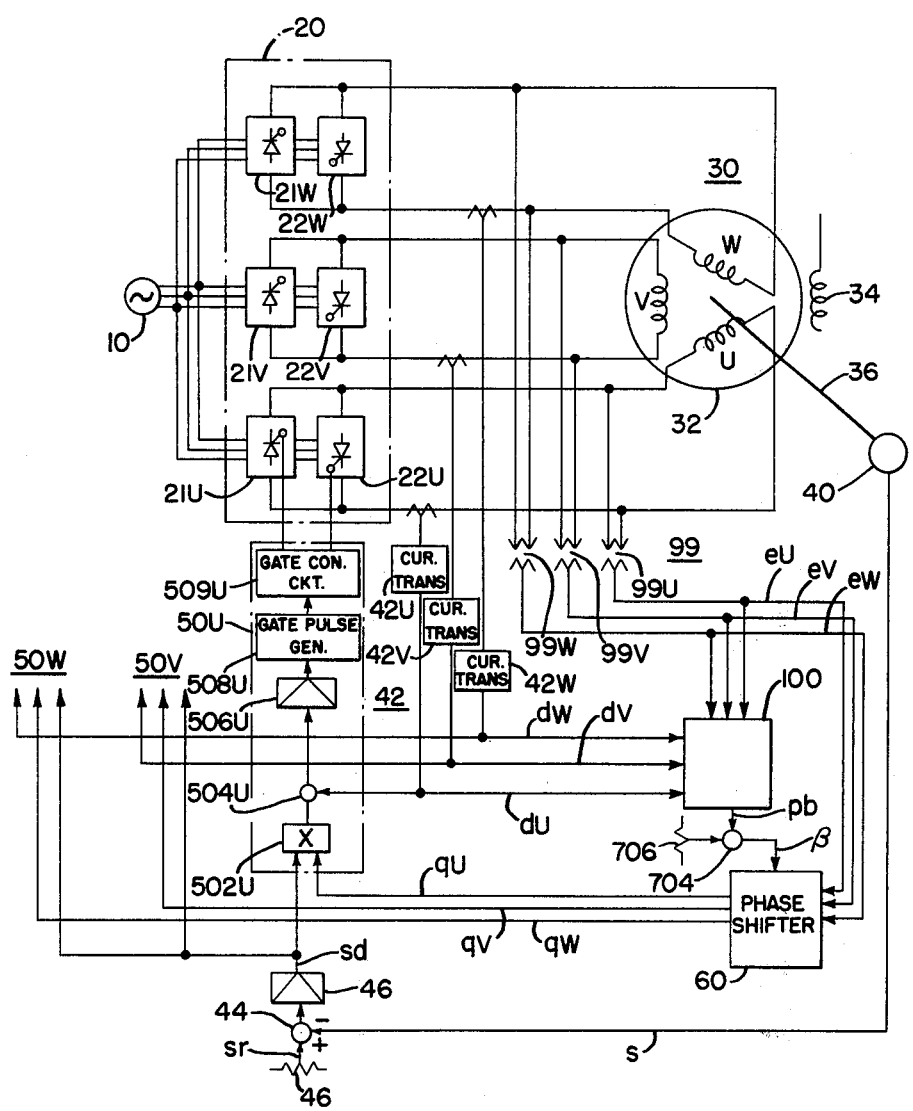
FIG. 8 is a schematic diagram of anothermore embodiment constructed in accordance with this invention.

Referring to FIG. 8, another embodiment constructed in accordance with this invention is shown, wherein like reference numerals also indicate like elements mentioned above. The feature of this embodiment is in that the phase shifting operation of the phase shifter 60 is controlled in accordance with a signal from a non-effective power detector 100. Further, the rotor position detector 38 was substituted for a voltage detector 99. As shown in FIG. 3, the voltage vector E almost coincides with the rotor position vector P in the stable operation of the synchronous machine 30. Therefore, this embodiment in which the phase shifting is controlled by detecting the non-effective power achieves the almost same result as that obtained by the embodiment shown in FIGS. 1, 4 and 6.

The voltage detector 99 has three voltage transformers 99U, 99V and 99W, each of which generates a signal proportional to the voltage applied to the corresponding armatures U, V and W of the synchronous machine 30. The signals eU, eV and eW from the voltage detector 99 are led to both the phase shifter 60 and the non-effective power detector 100 which is further provided with the signals dU, dV and dW from the actual current detector 42. In this embodiment, the non-effective power detector 100 has the same construction as the phase detector 80 shown in FIG. 2 or the another kind of phase detector 85 shown in FIG. 5. The output signal Pb of the non-effective power detector 100 is represented by following equation, $$Pb = E \cdot Im \sin \theta \quad (28)$$

where E is the amplitude of the signals eU, eV and eW. The signal Pb indicates the non-effective component of the power fed to the synchronous machine 30. The comparator 704 compares the signal Pb with the reference from the potentiometer 706, and generates the signal β which control the phase shifting operation of the phase shifter 60. The operation of this circuit mentioned above is almost the same as that shown in FIG. 1.

Figure 9:
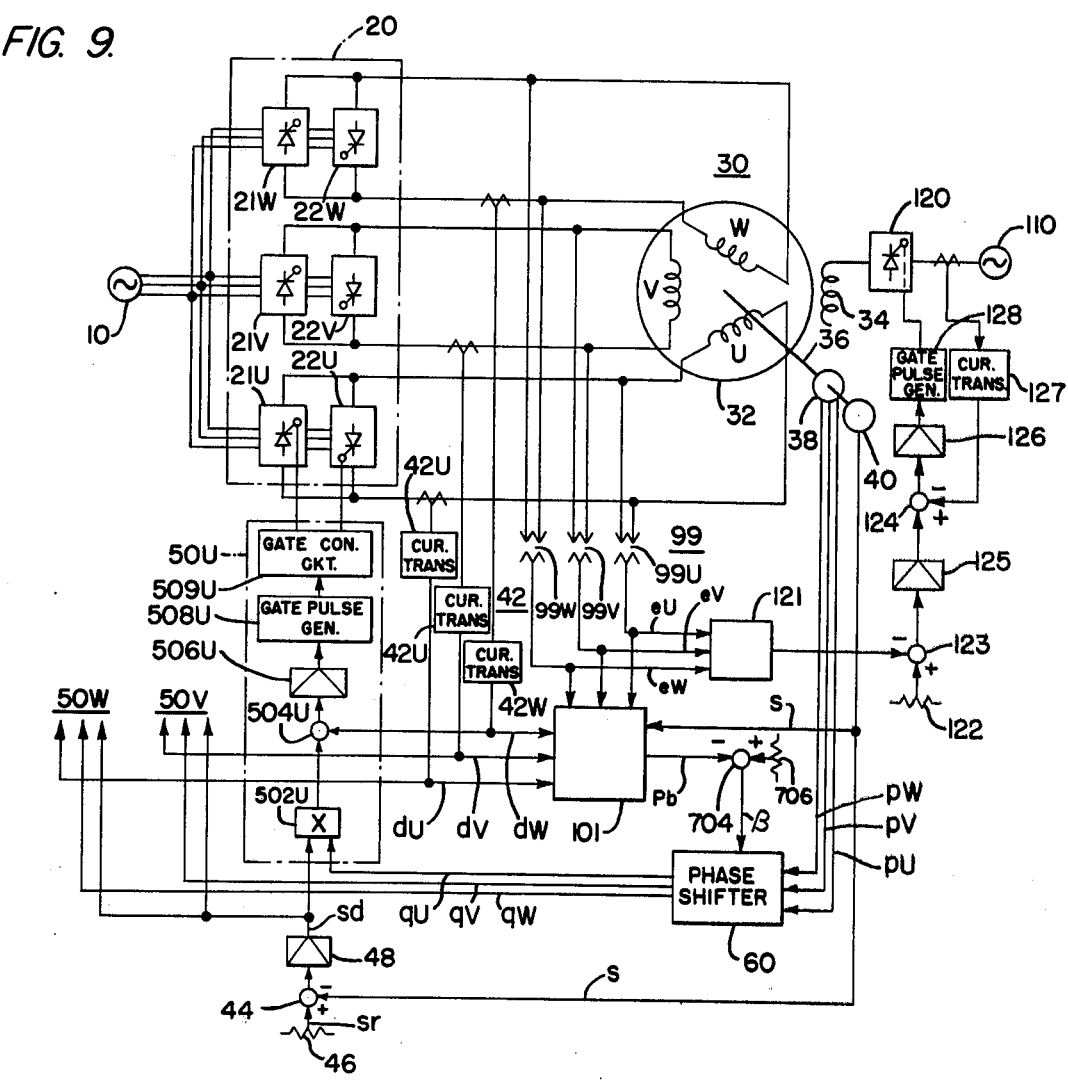
FIG. 9 shows one variation of the embodiment shown in FIG. 8.

Moreover, FIG. 9 shows another embodiment constructed in accordance with this invention. In this embodiment, another types of non-effective power detector 101 and a field winding control system are provided, which is mentioned in detail hereafter. In this figure, like reference numerals indicate like elements mentioned above. The non-effective power detector 101 is also provided with the signals dU, dV and dW from the actual current detector 42 and the signals eU, eV and eW from the voltage detector 99 and produces a signal Pb which led to the comparator 704. The comparator 704 produces a signal β to control the phase shifting operation of the phase shifter 60.

Figure 10:
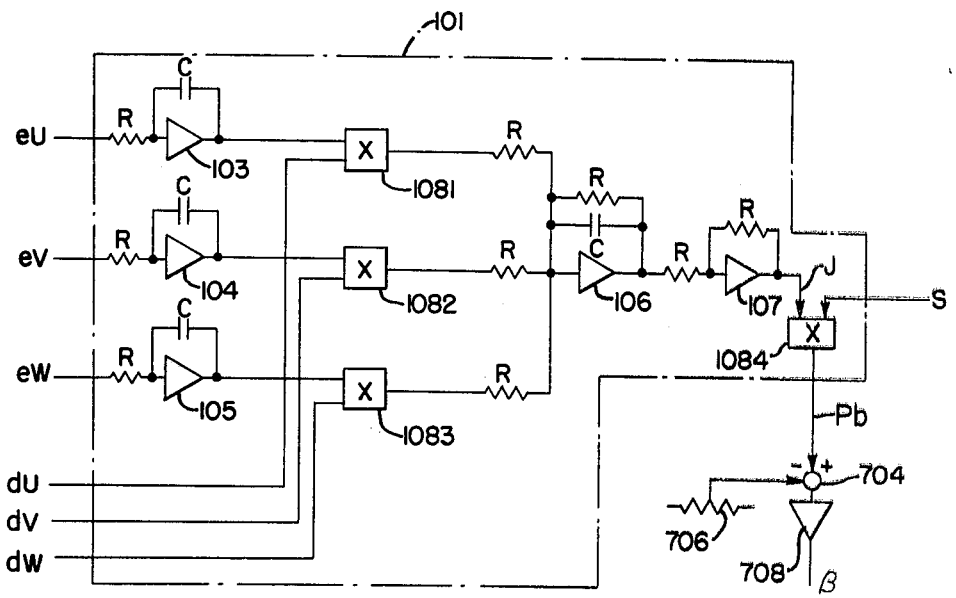
FIG. 10 shows the detail of a power factor detector shown in FIG. 9.

In FIG. 10, there are shown the details of the non-effective power detector 101 and the comparator 704. The non-effective power detector 101 is constructed with five OP amplifiers 103, 104, 105, 106 and 107 and four multipliers 1081, 1082, 1083, and 1084. The three OP amplifiers 103, 104 and 105, each of which has an input resistor R and a feed back capacitor C, operates as an integrater. Each of the integrators 103, 104 and 105 is provided with the corresponding signals eU, eV and eW from the voltage detector 99. Output signals from the integrators 103, 104 and 105 and the signals dU, dV and dW from the actual current detector 42 are led to the multipliers 1081, 1082 and 1083 respectively. Each of the multipliers 1081, 1082 and 1083 is led through respective resistor R to the OP amplifier 106 which has a parallel connection of a resistor R and a capacitor C as a feedback element. An output signal from the OP amplifier 106 is led to the comparator 74 through a sign changer 107 which is constructed with the OP amplifier, an input resistor R and a feedback resistor R. An output signal J from the integrator 106 through the sign changer 107 is represented by a following equation, $$Pb = -\frac{1}{T}\int_0^T (eU \cdot dU + eV \cdot dV + eW \cdot dW)dt \quad (29)$$

$$= \frac{3}{\omega} E \, Im \sin \theta$$

where, T is a period of the voltage signals eU, eV and eW, which is equal to that of the current signals dU, dV and dW, E an effective value of the voltage signals eU, eV and eW, and Im an effective value of the actual current signal dU, dV and dW. The signal J is led to one of the input terminals of the multiplier 1084, the other input terminal of which is provided with the speed signal s from the tachometer generator 40. The signal J, as is apparent from the equation (29), is in reverse proportion to the rotating speed of the rotor 32. The output signal Pb of the multiplier 1084 is represented by following equation, $$Pb = K \sin \theta \; (K = 3/\omega sE \, Im) \quad (30)$$

where K is constant if the synchronous machine 30 operates stably.

The output signal Pb from the non-effective power detector 101 is led to a plus input terminal of a comparator 704, a minus input terminal of which is connected to the potentiometer 706. The potentiometer 706 produces a reference signal proportional to the desired power factor. When the synchronous machine 30 is required to operate under the condition that the power factor is 1 (= cos 0°), the output signal of the potentiometer 706 is necessary to be preset at zero (= K sin 0°). When it is required to operate at the power factor cos δ, the output signal of the potentiometer 706 must be preset at the value proportional to K sin δ. The comparator 706, therefore, produces a different signal β, so that the phase shifting operation of the phase shifter 60 is controlld in accordance with the signal β.

Returning to FIG. 9, there is further provided a field winding feed system constructed with a power source 110, a thyristor converter 120 and a thyristor control circuit. The thyristor control circuit has a d.c. converter 121, a potentiometer 122, two comparator 123 and 124, two amplifiers 125 and 126, a current transformer 127 and a gate pulse generator 128. The converter 121 converts the signals eU, eV and eW from the voltage detector 99 into a signal proportional to the amplitude of the voltage applied to the armature windings. The signal from the converter 121 is led to a minus input terminal of a comparator 123, and a plus input terminal of which is connected to the potentiometer 122 generating a field current reference signal which is preset by the operator in accordance with the desired operating speed of the synchronous machine 30. The comparator 123 produces a differential signal as a current pattern signal determining the amplitude of the current to be fed to the field winding 34. The differential signal from the comparator 123 is led to a minus input terminal of the other comparator 124 through the amplifier 125, a minus input terminal of which is provided with a signal from the current transformer 127 propostional to the current fed to the field winding 34 actually. A differential signal from the comparator 124 is fed through the amplifier 126 to the gate pulse generator 128. The differential signal is proportional to the difference between the current pattern signal and the actual current. The gate pulse generator 128 generates a gate pulse controlling the commutation of the thyristor of the thyristor converter 120 in accordance with the differential signal from the comparator 124. The current fed for the field winding 34 is, therefore, controlled suitably in accordance with the voltage applied to the armature windings U, V and W of the synchronous machine 30. The field winding feed system mentioned above can be adapted to the circuit which is illustrated in FIG. 8 and the circuits which are illustrated in FIGS. 1, 4 and 6 with provision of the voltage detector which is indicated by the reference numeral 99.

What we claim:

1. A control apparatus for a synchronous machine with a field and an armature windings, one of the windings being provided on a stator of the machine and the other winding on a rotor thereof, comprising a converter having a plurality of thyristors for controlling an electric power fed to the armature winding, means for producing a signal corresponding to the position of the rotor, means for generating an armature current pattern signal on the basis of both the output signal of the producing means and the difference between a speed reference and an actual rotating speed of the rotor, and means for controlling the thyristors in accordance with the deviation between an actual armature current and the armature current pattern signal, characterized by means for detecting a phase difference between the actual armature current and the output signal of the producing means and means for shifting the output signal of the producing means in accordance with the output of said detecting means.

2. A control apparatus as claimed in claim 2, characterized in that there is further provided voltage detecting means for detecting the voltage applied to the armature winding, and that said detecting means detects the phase difference on the basis of the actual armature current and the output signal from said voltage detecting means.

3. A control apparatus as claimed in claim 2, characterized in that said detecting means produces the output in accordance with the non-effective power on the basis of the actual armature current and the output signal from said voltage detecting means.

4. A control apparatus as claimed in claim 1, characterized by means for regulating the amplitude of the armature current pattern signal from the generating means in accordance with the output of said detecting means.

5. A control apparatus as claimed in claim 1, characterized in that there are further provided voltage detecting means for detecting the voltage applied to the armature winding, and means for feeding the field winding with the electric power in accordance with the output from said voltage detecting means.

* * * * *